US012510942B2

(12) United States Patent
Yoon et al.

(10) Patent No.: US 12,510,942 B2
(45) Date of Patent: Dec. 30, 2025

(54) ELECTRONIC DEVICE FOR CONTROLLING SURFACE HEAT AND METHOD OF OPERATING THE ELECTRONIC DEVICE

(71) Applicant: Samsung Electronics Co., Ltd., Gyeonggi-do (KR)

(72) Inventors: Gunhyuk Yoon, Gyeonggi-do (KR); Chanhee Park, Gyeonggi-do (KR); Youngsan Kim, Gyeonggi-do (KR); Seungjoo Lee, Gyeonggi-do (KR); Seungchul Choi, Gyeonggi-do (KR)

(73) Assignee: Samsung Electronics Co., Ltd. (KR)

(*) Notice: Subject to any disclaimer, the term of this patent is extended or adjusted under 35 U.S.C. 154(b) by 431 days.

(21) Appl. No.: 17/884,995

(22) Filed: Aug. 10, 2022

(65) Prior Publication Data

US 2023/0050735 A1    Feb. 16, 2023

Related U.S. Application Data

(63) Continuation of application No. PCT/KR2022/011680, filed on Aug. 5, 2022.

(30) Foreign Application Priority Data

Aug. 10, 2021   (KR) .................. 10-2021-0105436

(51) Int. Cl.
    *G06F 1/20*     (2006.01)
    *G05B 13/02*    (2006.01)
    (Continued)

(52) U.S. Cl.
    CPC .......... *G06F 1/206* (2013.01); *G05B 13/026* (2013.01); *H04R 3/007* (2013.01); *H04R 29/001* (2013.01)

(58) Field of Classification Search
    CPC .......... G06F 1/206; H04R 3/007; H04R 9/06; G05B 13/026
    See application file for complete search history.

(56) References Cited

U.S. PATENT DOCUMENTS 9,729,986 B2 *   8/2017   Crawley .............. H04R 29/001
10,498,304 B2 *  12/2019  Gautama ................. H04R 3/04
(Continued)

FOREIGN PATENT DOCUMENTS

JP       09-266409       10/1997
JP       2011-165721     8/2011
(Continued)

OTHER PUBLICATIONS

International Search Report dated Nov. 4, 2022 issued in counterpart application No. PCT/KR2022/011680, 10 pages.

*Primary Examiner* — Mohammad Ali
*Assistant Examiner* — Vincent W Chang
(74) *Attorney, Agent, or Firm* — The Farrell Law Firm, P.C.

(57) ABSTRACT

Provided is an electronic device for controlling surface heart and a method of controlling the electronic device. The electronic device includes a speaker, a temperature sensor, a memory, and a processor electrically coupled to the speaker, the temperature sensor, and the memory. The processor obtains first temperature information based on impedance information measured in a coil included in the speaker; obtains second temperature information measured by the temperature sensor, the second temperature information based on a heat source disposed adjacent to the speaker; predicts a surface temperature of a surface area of the electronic device, opposite to an internal area in which the speaker is disposed, based on the first temperature information and the second temperature information using a non-
(Continued)

linear approximation function; and controls an audio signal input to the speaker based on the predicted surface temperature.

18 Claims, 7 Drawing Sheets

(51) Int. Cl.
*H04R 3/00* (2006.01)
*H04R 29/00* (2006.01)

(56) References Cited

U.S. PATENT DOCUMENTS

| | | | |
|---|---|---|---|
| 2013/0077794 A1* | 3/2013 | Risbo | H03G 11/008 |
| | | | 381/55 |
| 2013/0329898 A1 | 12/2013 | Williams et al. | |
| 2015/0215704 A1 | 7/2015 | Magrath et al. | |
| 2015/0229155 A1 | 8/2015 | Sporck et al. | |
| 2016/0323673 A1 | 11/2016 | Peng | |
| 2017/0094408 A1 | 3/2017 | Napoli et al. | |
| 2018/0014120 A1 | 1/2018 | Lawrence et al. | |
| 2019/0064892 A1 | 2/2019 | Kim et al. | |
| 2019/0305741 A1 | 10/2019 | Yoneda et al. | |
| 2020/0196063 A1 | 6/2020 | Kim | |
| 2021/0392795 A1* | 12/2021 | Rahim | H04R 9/022 |
| 2022/0331710 A1* | 10/2022 | Karaki | B01D 3/42 |

FOREIGN PATENT DOCUMENTS

| | | |
|---|---|---|
| KR | 1020130141966 | 12/2013 |
| KR | 1020170122760 | 11/2017 |
| KR | 1020180061279 | 6/2018 |
| KR | 1020190021663 | 3/2019 |

\* cited by examiner

|  | Gain | HPF |
|---|---|---|
| 35℃ or below | 0 | 0 |
| Over 35℃ to 36℃ | -0.5 | 0 |
| Over 36℃ to 37℃ | -1.0 | 110 |
| Over 37℃ to 38℃ | -1.5 | 110 |
| Over 38℃ to 39℃ | -2.0 | 110 |
| Over 39℃ to 40℃ | -2.5 | 130 |
| Over 40℃ to 41℃ | -3.0 | 130 |
| Over 41℃ to 42℃ | -3.5 | 130 |
| Over 42℃ to 43℃ | -4.0 | 150 |
| Over 43℃ to 44℃ | -4.5 | 150 |

FIG.5

ELECTRONIC DEVICE FOR CONTROLLING SURFACE HEAT AND METHOD OF OPERATING THE ELECTRONIC DEVICE

PRIORITY

This application is a Bypass Continuation Application of PCT International Application No. PCT/KR2022/011680, which was filed on Aug. 5, 2022, and claims priority to Korean Patent Application No. 10-2021-0105436, which was filed on Aug. 10, 2021, in the Korean Intellectual Property Office, the entire content of each of which is incorporated herein by reference.

BACKGROUND

1. Field

The disclosure relates generally to an electronic device for controlling surface heat generated by heat of a speaker and a method of operating the electronic device.

2. Related Art

An electronic device may provide audio to which a sound is applied to improve user immersion during execution of various services or functions. The electronic device may include a speaker that processes audio and externally outputs the processed audio, and provides various types of audio information to a user using the speaker. The electronic device may reproduce a call voice, a recorded voice, music, or audio information included in multimedia content through the speaker. Various technologies are under development to provide reproduced audio information as high-quality sounds through a speaker in an electronic device.

When a speaker outputs sound, heat may be generated. However, in view of the nature of the speaker as a heat source, it is difficult to directly measure the temperature by an internal component of the speaker, and it may be difficult to provide a temperature sensor for measuring a temperature in the speaker.

When the temperature of the speaker and the temperature of an area around the speaker rise due to heat generated from the speaker, components included in the speaker and components in the adjacent area may be deformed and damaged, thereby causing malfunction of the electronic device and/or degrading the performance of the speaker.

SUMMARY

The disclosure has been made to address at least the above-mentioned problems and/or disadvantages and to provide at least the advantages described below.

An aspect of the disclosure is to provide an electronic device for controlling the surface temperature of a speaker area to prevent the heat of a speaker and performance degradation of sounds output from the speaker, and a method of operating the electronic device.

Another aspect of the disclosure is to provide an electronic device for controlling a surface temperature that controls the heat of a speaker and reduces the performance degradation of sounds output from the speaker by predicting the surface temperature of a surface area in which the speaker is disposed based on impedance information about the speaker and temperature information measured in a component disposed around the speaker, and thus controlling an audio signal input to the speaker.

In accordance with an aspect of the disclosure, an electronic device is provided, which includes a speaker, at least one temperature sensor, a memory, and at least one processor electrically coupled to the speaker, the at least one temperature sensor, and the memory.

According to an embodiment, the at least one processor is configured to obtain first temperature information based on impedance information measured in a coil included in the speaker.

According to an embodiment, the at least one processor may be configured to obtain second temperature information measured by the at least one temperature sensor in a heat source, wherein the heat source is disposed adjacent to the speaker and generates heat.

According to an embodiment, the at least one processor may be configured to predict a surface temperature of a surface area of the electronic device, opposite to an internal area in which the speaker is disposed, based on the first temperature information and the second temperature information using a nonlinear approximation function.

According to an embodiment, the at least one processor may be configured to control an audio signal input to the speaker based on the predicted surface temperature.

In accordance with an aspect of the disclosure, a method is provided for operating an electronic device that includes obtaining first temperature information based on impedance information measured in a coil included in a speaker of the electronic device.

According to an embodiment, the method of operating an electronic device may include obtaining second temperature information measured by at least one temperature sensor of the electronic device in a heat source, wherein the heat source is disposed adjacent to the speaker and generates heat.

According to an embodiment, the method of operating an electronic device may include predicting a surface temperature of a surface area of the electronic device, opposite to an internal area in which the speaker is disposed, based on the first temperature information and the second temperature information using a nonlinear approximation function.

According to an embodiment, the method of operating an electronic device may include controlling an audio signal input to the speaker based on the predicted surface temperature to decrease a temperature of the surface area.

BRIEF DESCRIPTION OF THE DRAWINGS

The above, and other aspects, features, and advantages of certain embodiments of the disclosure will be more apparent from the following detailed description taken in conjunction with the accompanying drawings, in which:

FIG. 5 is a table illustrating an operation of an electronic device according to an embodiment;

DETAILED DESCRIPTION

Figure 1:
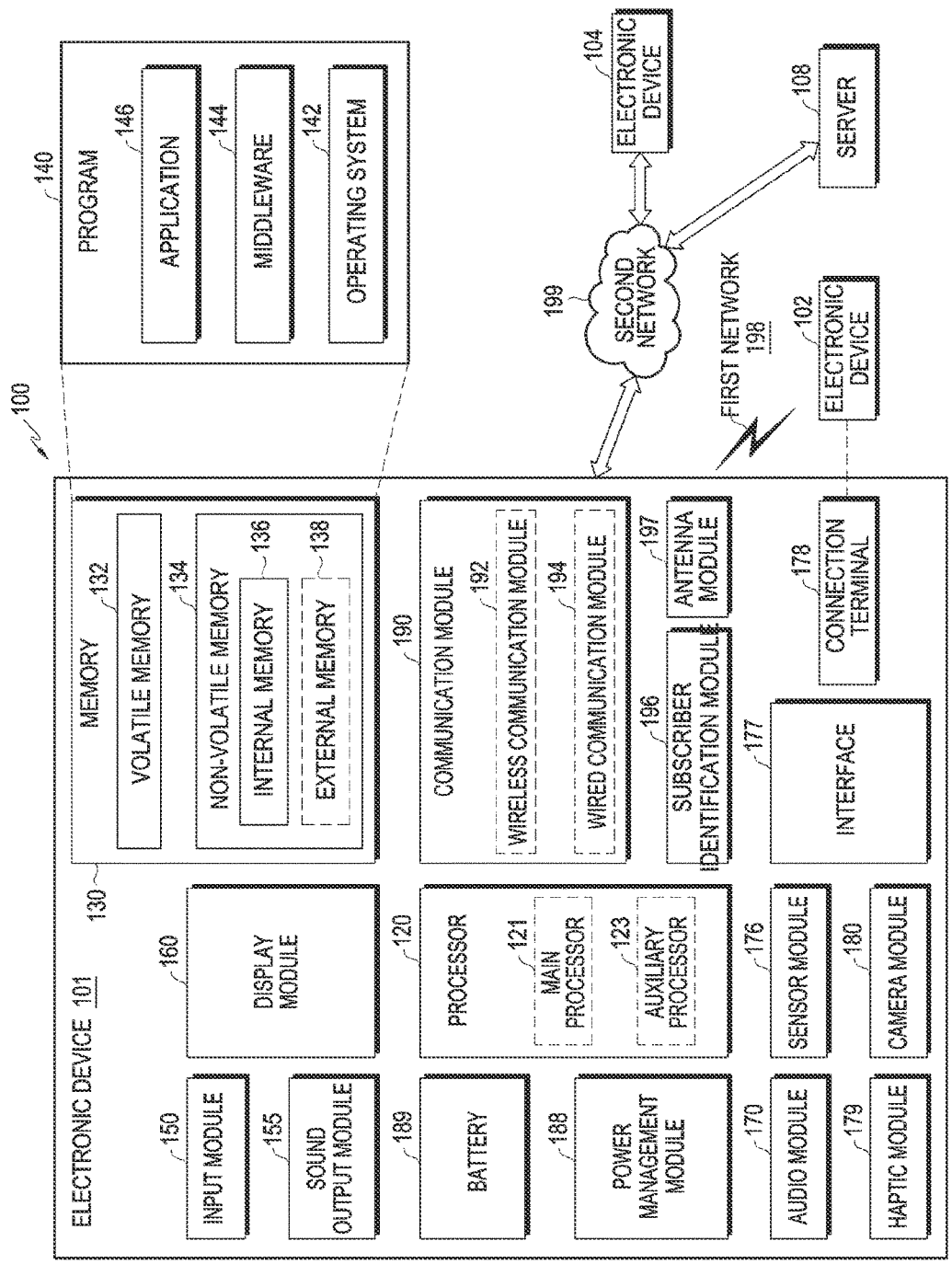
FIG. 1 illustrates an electronic device in a network environment according to an embodiment.

Hereinafter, embodiments of the disclosure will be described in detail with reference to the accompanying drawings. In the disclosure, embodiments are described in the drawings and a related detailed description is set forth, but this is not intended to limit the embodiments of the disclosure. Descriptions of well-known functions and constructions are omitted for the sake of clarity and conciseness.

With reference to the attached drawings, an electronic device according to various embodiments will be described below. The term user as used in various embodiments may refer to a person using an electronic device or a device (e.g., artificial intelligent electronic device) using an electronic device. In relation to the description of the drawings, the same or similar reference numerals may be used to denote the same or similar components.

FIG. 1 illustrates an electronic device in a network environment according to an embodiment.

Referring to FIG. 1, an electronic device 101 in a network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the NPU) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent DNN (BRDNN), deep Q-network, or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the AP) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a $5^{th}$ generation (5G) network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The wireless communication module 192 may support a 5G network, after a $4^{th}$ generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a PCB, an RFIC disposed on a first surface (e.g., the bottom surface) of the PCB, or adjacent to the first surface and capable of supporting a designated high-frequency band (e.g., the mmWave band), and a plurality of antennas (e.g., array antennas) disposed on a second surface (e.g., the top or a side surface) of the PCB, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or MEC. In another embodiment, the external electronic device 104 may include an internet-of-things (IoT) device. The server 108 may be an intelligent server using machine learning and/or a neural-network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
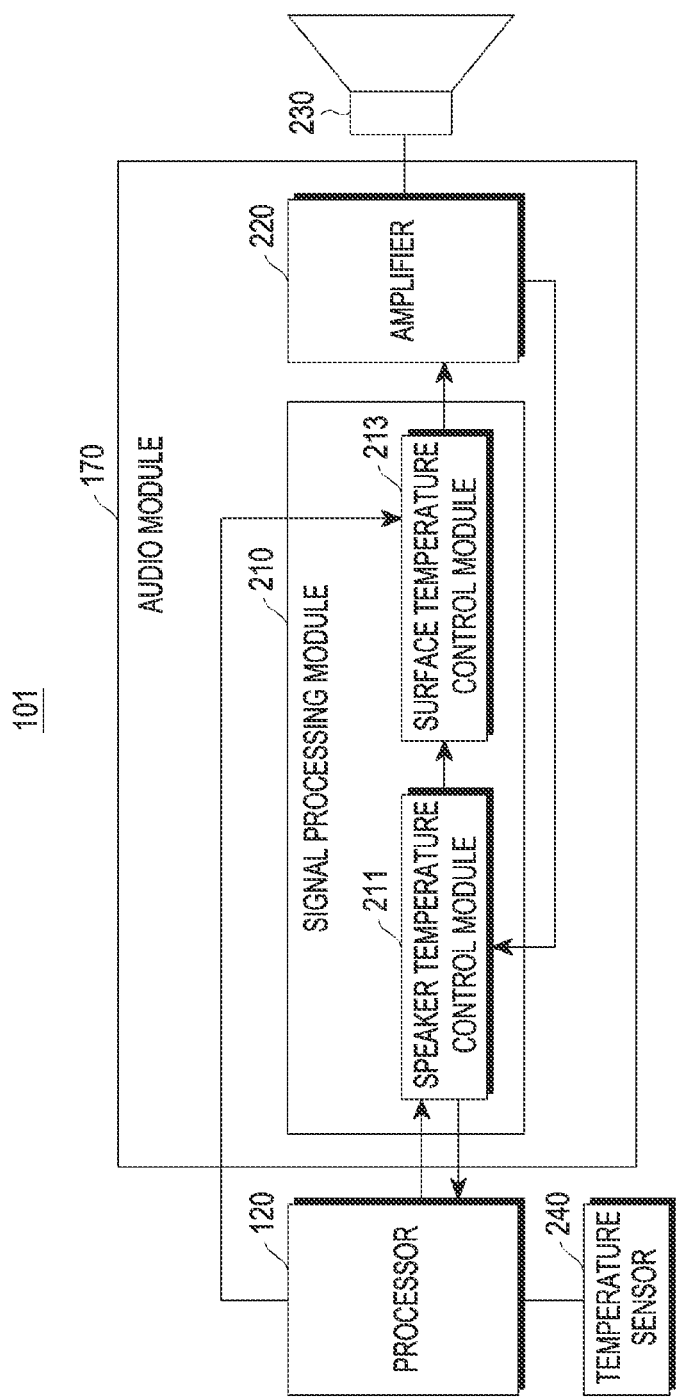
FIG. 2 illustrates a configuration of an electronic device according to an embodiment.
Figure 3:
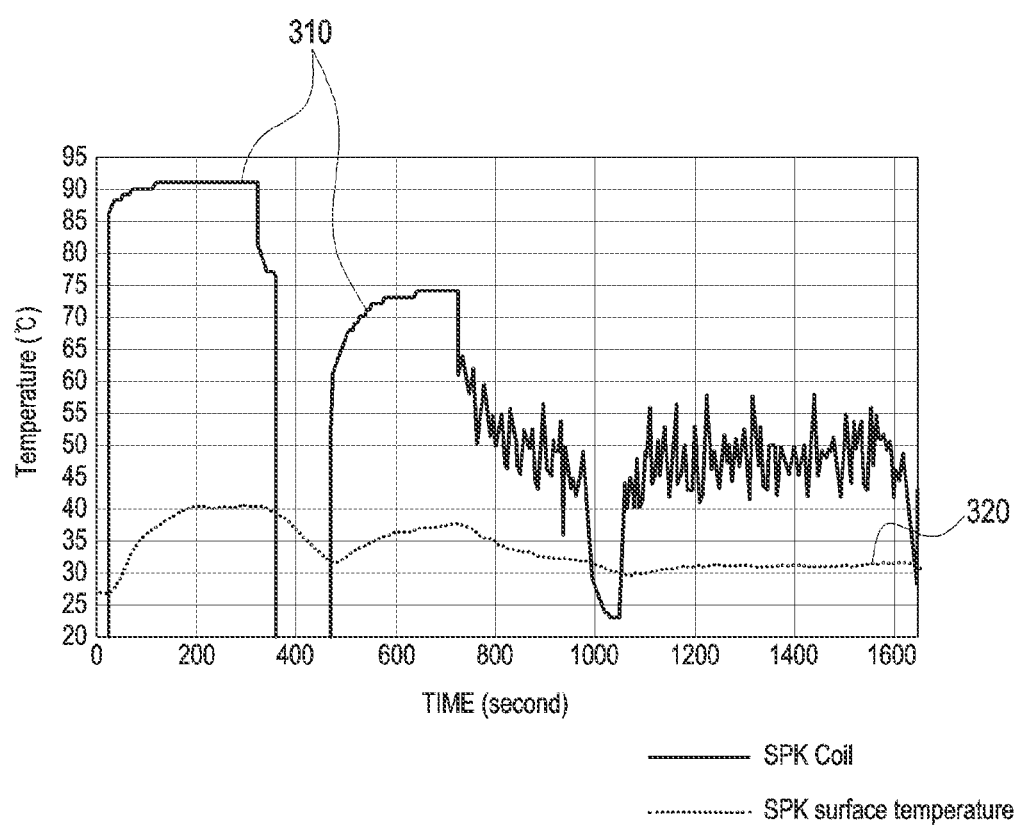
FIG. 3 is a graph illustrating an example of an operation of an electronic device according to an embodiment.

FIG. 2 illustrates a configuration of an electronic device according to an embodiment. FIG. 3 is a graph illustrating an operation of an electronic device according to an embodiment.

Referring to FIGS. 1 and 2, according to an embodiment, the electronic device 101 may include at least one processor 120, the memory 130, the audio module 170, and/or a speaker 230. The electronic device 101 may further include other components required for controlling the surface temperature of the electronic device 101.

According to an embodiment, the processor 120 may provide overall control to the operations of the electronic device 101. The processor 120 may receive a command from other components (e.g., the memory 130, the audio module 170, and/or the speaker 230), interpret the received command, and perform an operation or process data according to the interpreted command. The processor 120 may be implemented in software, hardware such as a chip or circuitry, or a combination of software and hardware. The processor 120 may be a single one or a set of a plurality of processors.

According to an embodiment, the processor 120 may obtain impedance information measured in a coil included in the speaker 230 from the audio module 170 or the speaker 230, and obtains first temperature information based on the obtained impedance information. The processor 120 may obtain an internal current value and/or voltage value of the speaker 230, and calculate an impedance based on the obtained current value and/or voltage value. For example, the impedance measured in the coil of the speaker 230 may be used to predict or determine the temperature of the speaker 230, and as the temperature increases, the impedance of the coil may increase. The processor 120 may identify a temperature value corresponding to the measured impedance, and obtain first temperature information including the identified temperature value. For example, the processor 120 may use a table (e.g., a first table) stored in the memory 130 to obtain the first temperature information. The first table may be made up of at least one designated empirical temperature value corresponding to each specified impedance value of a plurality of specified impedance values measurable in the coil of the speaker 230. When the temperature value increases, the impedance value may also increase in proportion to the temperature value.

According to an embodiment, as the processor 120 executes a function (e.g., an operation, a program, or an application) including audio information, the processor 120 may obtain the impedance value of the coil of the speaker 230 by monitoring heat generated by an audio signal input to the speaker 230.

Referring to FIG. 3, the processor 120 may obtain first temperature information including temperature values identified based on impedance values continuously measured by continuously monitoring the heat of the speaker 230, as noted from a first temperature information curve 310.

Referring again to FIG. 2, According to an embodiment, the processor 120 may obtain second temperature information including a temperature value that at least one temperature sensor 240 measures in at least one component (e.g., at least one of the processor, the battery, or the communication module) which is disposed adjacent to the speaker 230 and which generates heat. The processor 120 may obtain the second temperature information including temperature values measured by continuously monitoring heat generated from the at least one component, during execution of content (e.g., a function, program, or application) including audio information.

According to an embodiment, the processor 120 may predict the surface temperature of an external surface area of the electronic device 101, corresponding to an internal area of the electronic device 101 in which the speaker 230 is disposed, based on the first temperature information and the second temperature information using a nonlinear approximation function. For example, the electronic device 101 may predict the surface temperature by calculating virtual temperature data through non-linear fitting of the first temperature information and the second temperature information which are placed ii a non-linear relationship. The processor 120 may fit the second temperature information including temperature values measured in the at least one component over time to temperature values of the coil of the speaker over time on the first temperature information graph (e.g., curve) 310 illustrated in FIG. 3. The processor 120 may set a target temperature by using continuously obtained second temperature information, convert the target temperature into virtual temperature data by final exponential curve fitting, and predict the virtual temperature data over time as the surface temperature of the surface area of the speaker, as noted from a predicted surface temperature graph (e.g., curve) 320 illustrated in FIG. 3. For example, as illustrated in FIG. 3, as the temperature rises to a highest temperature during a specific time period (e.g., about 0 to about 400 seconds) on the first temperature information curve 310 representing the temperatures of the coil of the speaker continuously obtained over time, a temperature value (e.g., about 41° C.) on the predicted surface temperature curve 320 of the speaker, corresponding to the highest temperature (e.g., about 90° C.) during the specific time period (e.g., about 0 to about 400 seconds) may be set as a target temperature. For example, the target temperature may be set to be less than a temperature that potentially damages components inside or around the speaker. For example, as the temperature rises over time and then is maintained in a specific temperature range (e.g., about 30° C. to about 36° C.) during a specific time period (e.g., about 800 to about 1600 seconds), a highest temperature (e.g., about 36° C.) during the specific time period (e.g., about 800 to about 1600 seconds) may be set as a threshold.

According to an embodiment, the processor 120 of the electronic device 101 may predict the surface temperature based on Equation (1):

$$Tskin(t + \Delta t) = Tskin(t) + (Tsat(t + \Delta t) - Tskin(t)) \times e^{-\frac{\Delta t}{\tau}} \quad (1)$$

Tskin(t) represents virtual temperature data (e.g., a predicted temperature) measured in at least one component as a heat source disposed adjacent to the speaker 230, and Δt represents a monitoring time of the virtual temperature data. Tsat represents a saturation temperature, $$e^{-\frac{\Delta t}{\tau}}$$

represents the monitoring time relative to the saturation temperature time, e represents a variation (e.g., temperature change modeling), and τ represents a saturation temperature time constant.

According to an embodiment, the processor 120 may control the audio module 170 to obtain the impedance value of the coil, in order to continuously monitor the heat of the coil of the speaker 230 during execution of content (e.g., a function, program, or application) including audio information. The processor 120 may control the temperature sensor 240 to measure the temperature of the at least one component, in order to continuously monitor the at least one component around the speaker during execution of the content including the audio information. The processor 120 may obtain first temperature information based on the measured impedance value, obtain second temperature information based on the measured temperature value of the at least one component, and predict a surface temperature based on the obtained first temperature information and second temperature information. When the execution of the content including the audio information is completed, the processor 120 may discontinue the monitoring operation for obtaining the first temperature information and the second temperature information and the operation of predicting the surface temperature. When audio information is not input to the audio module 170 during a specified time period according to the execution of the content including audio information, the processor 120 may control the audio module 170 to temporarily stop the operation of controlling an audio signal for controlling the heat of the speaker. Subsequently, when audio information is input again, the processor 120 may control the audio module 170 to perform the audio signal control operation for controlling the heat of the speaker.

According to an embodiment, the processor 120 may control an audio signal input to the speaker 230 by controlling an audio signal pre-processing operation of the audio module 170 or an operation of the speaker 230 based on the predicted surface temperature. For example, the processor 120 may control the strength of the audio signal input to the speaker 230 to decrease, thereby reducing the heat of the speaker 230 and the performance degradation of output sounds. For example, the controlled audio signal may include an output or a frequency band.

According to an embodiment, the processor 120 may identify virtual temperature data corresponding to the predicted surface temperature in a control information table (e.g., a second table) stored in the memory 130, and control the audio module 170 or an amplifier 220 to control the audio signal based on control information mapped to the identified virtual temperature data. The control information may include at least one of a gain value or a high pass filter (HPF) value. For example, as the temperature value (e.g., virtual temperature data) increases, the gain value may decrease and the HPF value may increase. For example, the second table may be developed by mapping control information to virtual temperature data corresponding to surface temperatures by using the predicted surface temperature curve 320 of the speaker as illustrated in FIG. 3. In another example, the second table may be based on values specified through a speaker performance test.

According to an embodiment, the processor 120 may continuously predict a surface temperature during execution of content (e.g., a function, program, or application) including audio information to determine whether the predicted surface temperature exceeds a specified threshold. When the predicted surface temperature is identified to exceed the specified threshold, the processor 120 controls the audio module 170 or the amplifier 220 to reduce the strength (e.g., current intensity) of an audio signal input to the speaker 230, so that the temperature of the speaker 230 may be decreased. When identifying the predicted surface temperature as being less than the specified threshold along with the control of the audio signal, the processor 120 may not change the strength of the audio signal input to the speaker 230. For example, as control information mapped to the virtual temperature data less than the specified threshold is zero, the audio signal may not be changed by the control information. In another example, when identifying the predicted surface temperature as being less than the specified threshold, the processor 120 may temporarily stop the audio signal control operation until the predicted surface temperature exceeds the specified threshold, without performing the control operation of changing the audio signal by reflecting the control information in the audio signal. For example, the processor 120 may change the performance of an operating frequency clock (CLK) of the audio signal to a specific value by a signal processing module 210 of the audio module 170. For example, when the predicted surface temperature exceeds the specified threshold, the processor 120 may set the signal processing module 210 (e.g., an equalizer) to a low output mode, while outputting sounds corresponding to the audio signal through the speaker 230.

According to an embodiment, the audio module 170 may include the signal processing module 210 and/or the amplifier 220, and may be electrically coupled to the at least one processor 120 and the speaker 230. For example, the amplifier 220 may be formed separately from the audio module 170. Although the amplifier 220 has been described as disposed between the signal processing module 210 and the speaker 230, as illustrated in FIG. 2, the amplifier 220 may be disposed between the signal processing module 210 and the processor 120 in another example. According to an embodiment, the signal processing module 210, i.e. signal processing circuit, may include a speaker temperature control module 211 and a surface temperature control module 213, i.e. surface temperature control module. The speaker temperature control module 211 may continuously measure the current or voltage value of the coil of the speaker 230 by monitoring the coil, and calculate an impedance or provide the measured current or voltage value to the processor 120, according to a command from the processor 120. The surface temperature control module 213 may perform the audio signal controlling operation based on control information corresponding to a predicted surface temperature according to a command from the processor 120. The surface temperature control module 213 may reduce the strength of an audio signal input to the speaker 230 by adjusting amplification of the audio signal through the amplifier 220 based on the control information. In an embodiment, at least some functions of the audio module 170 may be performed by the processor 120.

According to an embodiment, the speaker 230 may be electrically coupled to the processor 120 and the audio module 170, and may correspond to or be included in the sound output module 155 illustrated in FIG. 1. The speaker 230 may include a coil, a diaphragm, and a magnet, convert an audio signal (e.g., a pulse code modulation (PCM) signal) received from the processor 120 or the audio module 170 into vibrations, and output sounds generated by the converted vibrations to the outside. The speaker 230 may receive an audio signal amplified by the amplifier 220 included in the audio module 170 or formed as a module separate from the audio module 170. Based on the received audio signal, current may be induced to file through the coil of the speaker 230. The coil may be located within a magnetic field of a magnet (e.g., a permanent magnet) included in the speaker 230, and may receive a force (e.g.; a magnetic force) according to the intensity of the flowing current. The diaphragm may convert the audio signal into vibrations according to the force applied to the coil. The vibrations of the diaphragm may radiate sound waves by generating microscopic waves in the air. As the diaphragm vibrates due to the force applied to the coil, the speaker 230 may output sounds generated by the converted vibrations to the outside. As the speaker 230 outputs the sounds, the coil may generate heat. The impedance of the coil may change according to the heat generation. The impedance of the coil may be used to predict or determine the temperature of the speaker 230. For example, as the temperature increases, the impedance of the coil may increase. The impedance of the coil may be obtained by the processor 120 or the audio module 170 to predict or determine the temperature of the speaker 230. The speaker 230 may not include a temperature sensor or thermistor for directly measuring a temperature in view of the design structure of the speaker 230 and the nature of a heat source that generates heat, and may radiate the heat generated from the coil to the outside of the speaker through heat radiation components. The heat generated by the speaker 230 may be, predicted by predicting the surface temperature of the external area opposite to the internal area of the electronic device in which the coil of the speaker 230 is disposed, based on the temperature of the heat radiated to the outside through the speaker 230.

According to an embodiment, the at least one temperature sensor 240 may correspond to at least one temperature sensor of the sensor module 176 of FIG. 1. The at least one temperature sensor 240 may be disposed adjacent to at least one component generating heat disposed around the speaker 230, and may be a single one or a set of a plurality of temperature sensors. For example, the temperature sensor 240 may include a thermistor. The thermistor may change its resistance according to a temperature. For example, the resistance of the thermistor may increase with the temperature. The at least one temperature sensor 240 may measure the temperature of the at least one component according to a command from the processor 120. The at least one temperature sensor 240 may operate under the control of the at least one processor (e.g., an AP or a CP) 120. The at least one temperature sensor 240 may passively transmit a state corresponding to a temperature value in response to a command from the at least one processor 120, and the at least one processor 120 may obtain the temperature associated with the at least one component from the at least one temperature sensor 240 in response to the reception of the state.

According to an embodiment, the electronic device 101 may include a display module (e.g., the display module 160 of FIG. 1), and the display module may be electrically coupled to the processor 120 and display various types of information for controlling a surface temperature caused by the heat of the speaker 230 according to a command from the processor 120. The display module may display information related to execution of content (e.g., a function, a program, or an application) including audio information.

As described above, main components of an electronic device have been described by taking the electronic device 101 of FIGS. 1 and 2. However, in various embodiments, all of the components illustrated in FIGS. 1 and 2 are not compulsory, and the electronic device 101 may be implemented with more or fewer components than the illustrated components. The positions of the main components of the electronic device 101 described with reference to FIGS. 1 and 2 may be changed according to various embodiments.

According to an embodiment, an electronic device (the electronic device 101 of FIGS. 1 and 2) may include a speaker (e.g., the speaker 230 of FIG. 2), at least one temperature sensor, a memory (e.g., the memory 130 of FIG. 1), and at least one processor (e.g., the processor 120 of FIG. 1) electrically coupled to the speaker, the at least one temperature sensor, and the memory. The at least one processor may be configured to obtain first temperature information based on impedance information measured in a coil included in the speaker, obtain second temperature information measured by the at least one temperature sensor in a heat source, wherein the heat source is disposed adjacent to the speaker and generates heat, predict a surface temperature of a surface area of the electronic device, opposite to an internal area in which the speaker is disposed, based on the first temperature information and the second temperature information using a nonlinear approximation function, and control an audio signal input to the speaker based on the predicted surface temperature.

According to an embodiment, the at least one processor may be configured to predict the surface temperature by obtaining the first temperature information and the second temperature information during execution of content including audio information corresponding to the audio signal.

According to an embodiment, the electronic device may further include an audio module (e.g., the audio module 170 of FIG. 1) electrically coupled to the speaker and the at least one processor, and the at least one processor may be configured to control the audio module to decrease a strength of the audio signal input to the speaker, when it is identified that the predicted surface temperature exceeds a threshold.

According to an embodiment, the at least one processor may be configured to control the audio module to sequentially decrease the strength of the audio signal based on control information corresponding to each of predicted surface temperatures from the threshold until a specified target temperature is reached.

According to an embodiment, the at least one processor may be configured not to change the strength of the audio signal, when a next predicted surface temperature is less than the threshold after controlling the audio module to decrease the strength of the audio signal.

According to an embodiment, the at least one processor may is configured to adjust amplification of the audio signal to decrease the strength of the audio signal based on control information mapped to each virtual temperature data, stored in the memory.

According to an embodiment, the control information may include at least one of a gain value or an HPF value.

According to an embodiment, the at least one processor may be configured to measure at least one of a voltage value or a current value of the coil included in the speaker, obtain the impedance information based on the at least one of the measured at least one the voltage value or the current value, and identify the first temperature information based on the obtained impedance information.

According to an embodiment, the at least one temperature sensor is disposed adjacent to the heat source.

Figure 4:
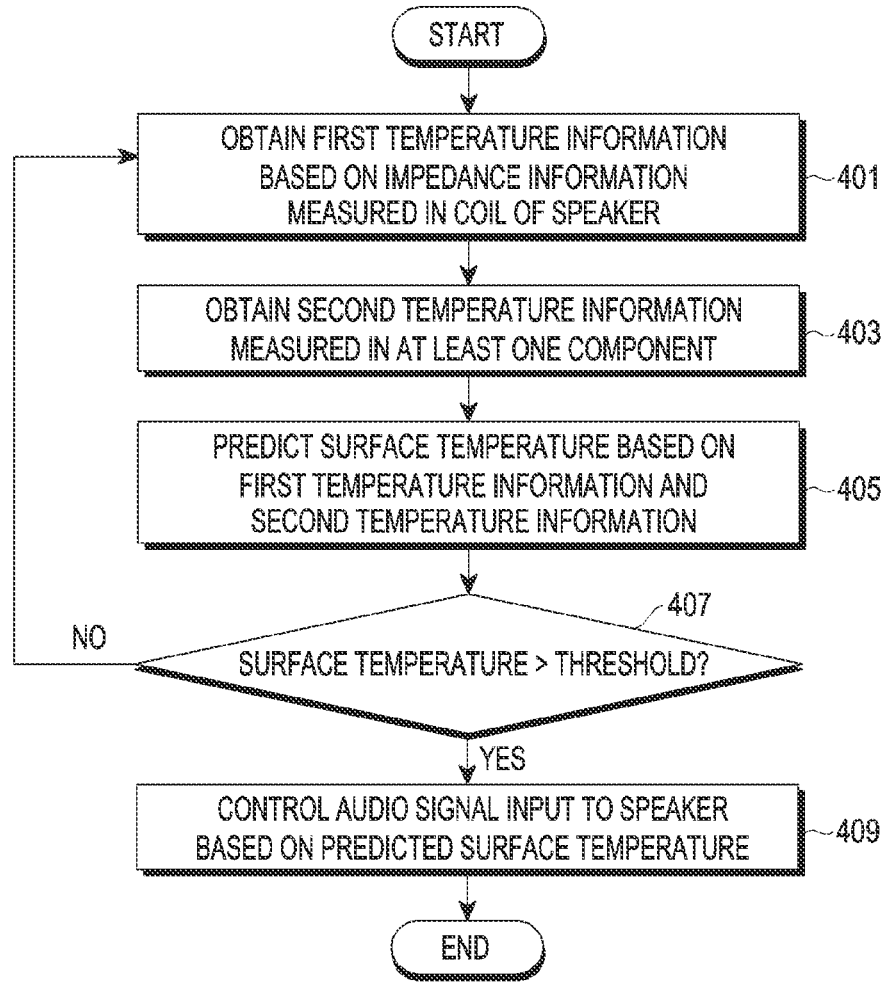
FIG. 4 is a illustrates a method of operating an electronic device according to an embodiment.

FIG. 4 is a illustrates a method of operating an electronic device according to an embodiment.

Referring to FIG. 4, in operation 401, according to an embodiment, an electronic device (e.g., the electronic device 101 of FIG. 1 or FIG. 2) may obtain first temperature information based on impedance information measured in a coil included in a speaker (e.g., the sound output module 155 of FIG. 1 or the speaker 230 of FIG. 2). For example, the electronic device may identify a temperature value corresponding to a measured impedance value based on a table in which a temperature value is mapped to each impedance value of the coil; and obtain first temperature information including the identified temperature value.

In operation 403, the electronic device obtains second temperature information measured in at least one component by at least one temperature sensor. The at least one component may be a component (e.g., at least one of a processor, a battery, or a communication module) that is a heat source disposed adjacent to the speaker and generating heat. At least one temperature sensor may be disposed adjacent to each of heat sources among the components included in the electronic device.

In operation 405, the electronic device predicts the surface temperature of a surface area of the electronic device, opposite to an internal area in which the speaker is disposed, based on the first temperature information and the second temperature information using a nonlinear approximation function.

In operation 407, the electronic device identifies whether the predicted surface temperature exceeds a specified threshold. Upon identifying that the predicted surface exceeds the specified threshold, the electronic device performs operation 409. Upon identifying that the predicted surface temperature is equal to or less than the specified threshold, the electronic device performs operation 401.

In operation 409, the electronic device controls an audio signal input to the speaker based on the predicted surface temperature. As illustrated in FIG. 5, the electronic device identifies a set temperature value corresponding to the predicted surface temperature in a control information table stored in a memory, and identifies control information (e.g., a gain value and/or a HPF value) corresponding to the identified temperature value. The electronic device adjusts the audio signal by applying the identified control information to the audio signal by an audio module (e.g., the audio module 170 of FIGS. 1 and 2) or an amplifier (e.g., the amplifier 220 of FIG. 2) and transmits the adjusted audio signal to the speaker. The speaker changes the received audio signal into an acoustic signal and externally outputs the acoustic signal. For example, the processor 120 may decrease the strength of the audio signal input to the speaker 230, thereby reducing heat generated by the speaker 230 and the performance degradation of output sounds.

When performing operation 405 of FIG. 4, the electronic device predicts the surface temperature by calculating virtual temperature data through, for example, nonlinear fitting of the first temperature information and the second temperature information in a non-linear relationship. The electronic device fits second temperature information including temperature values measured in at least one component over time to obtained first temperature information including temperature values of the coil of the speaker over time. The electronic device sets a target temperature and a threshold by using temperature values continuously measured in the at least one component, converts the target temperature and the threshold into virtual temperature data through final exponential curve fitting, and predicts the virtual temperature data over time as the surface temperature of the surface area of the speaker. For example, the target temperature may be set to be less than a temperature that affects damage of components inside or around the speaker. For example, the electronic device may predict the surface temperature by Equation 1, above.

The electronic device obtains the first temperature information based on continuously measured impedance values during execution of content (e.g., a function, a program, or an application) including audio information, obtains the second temperature information based on continuously measured temperature values of the at least one component, and predicts the surface temperature based on the obtained first temperature information and second temperature information, by repeating operations 401 to 405 in the method of FIG. 4.

Upon completion of the execution of the content including the audio information, the electronic device may discontinue the monitoring operation for obtaining the first temperature information and the second temperature information and the operation of predicting the surface temperature. When audio information is not input to the audio module during a specified time period according to the execution of the content including the audio information, the electronic device may temporarily discontinue the operation of controlling an audio signal, to control the heat of the speaker. When audio information is input again, the electronic device may perform the operation of controlling an audio signal to, control the heat of the speaker.

The electronic device may identify virtual temperature data corresponding to the predicted surface temperature in the control information table (e.g., a second table) stored in the memory (e.g., the memory 130 of FIG. 1), and control the audio module or an amplifier. (e.g., the amplifier 220 of FIG. 2) to control the audio signal based on control information mapped to the virtual temperature data. The control information may include at least one of a gain value or a HPF value. For example, as the temperature value (e.g., virtual temperature data) increases, the gain value may decrease and the HPF value may increase. For example, the second table may be developed by mapping control information to virtual temperature data corresponding to surface temperatures by using the surface temperature curve 320 of the speaker, as illustrated in FIG. 3. In another example, the second table may be developed based on values set through a performance test of the speaker.

When identifying that the predicted surface temperature exceeds the specified threshold in operation 407 of FIG. 4, the electronic device may decrease the strength (e.g., current intensity) of the audio signal input to the speaker to reduce the temperature of the speaker by the audio module or the amplifier. Subsequently, when identifying that the predicted surface temperature at the next time is less than the specified threshold, the electronic device may not change the strength of an audio signal input to the speaker. For example, as control information mapped to corresponding virtual temperature data less than the specified threshold is set to a value of 0, the audio signal may not be changed by the control information. In another example, when identifying that the predicted surface temperature is less than the specified threshold, the electronic device may not perform the control operation of changing an audio signal by reflecting control information in the audio signal, and may temporarily discontinue the operation of controlling an audio signal until the predicted surface temperature exceeds the specified threshold. For example, the electronic device may change the performance of the operating frequency of the audio signal to a specific value by the audio module. For example, when the predicted surface temperature exceeds the specified threshold, the electronic device may set the signal processing module (e.g., an equalizer) to a low output mode to reduce the heat of the speaker, while outputting sounds corresponding to the audio signal through the speaker.

Figure 6:
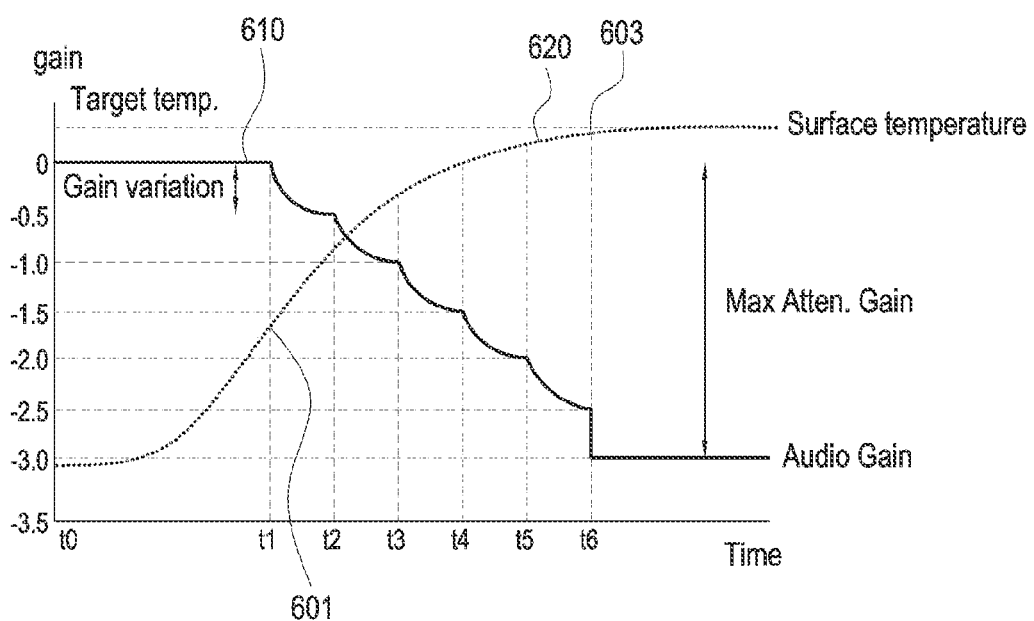
FIG. 6 is a graph illustrating an operation of an electronic device according to an embodiment.
Figure 7:
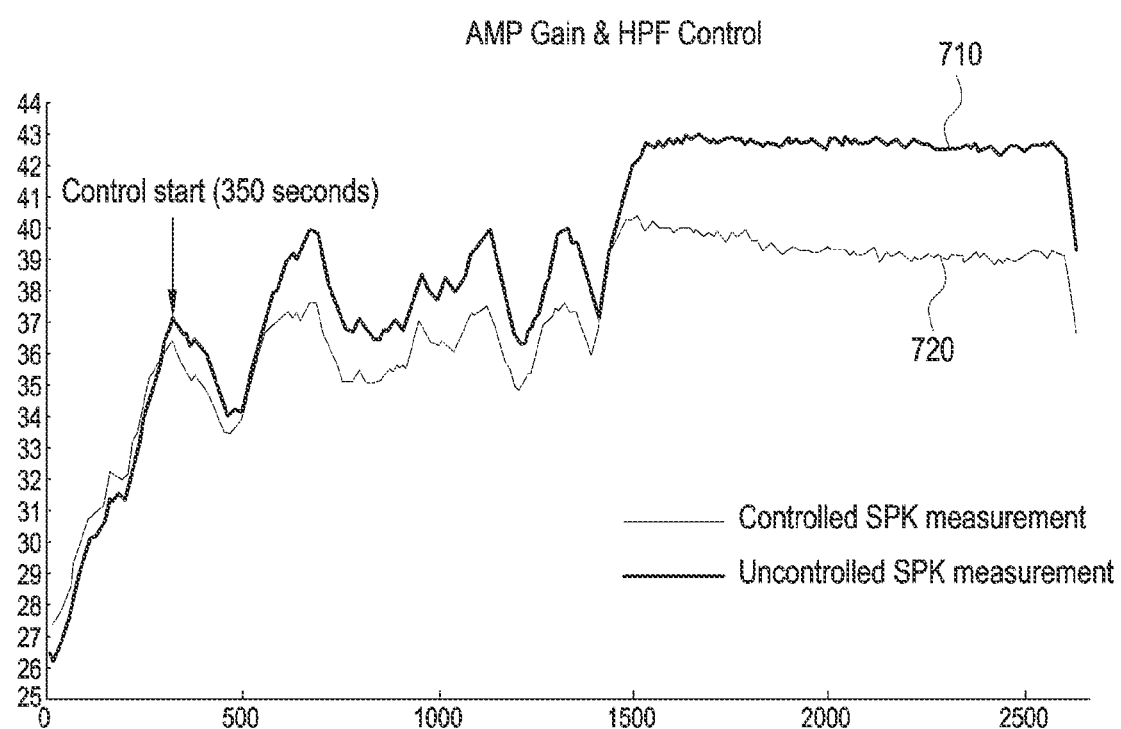
FIG. 7 is a graph illustrating a result of a method of operating an electronic device according to an embodiment.

FIG. 5 is a table illustrating an operation of an electronic device according to an embodiment, FIG. 6 is a graph illustrating an operation of the electronic device according to an embodiment, and FIG. 7 is a graph illustrating a result of a method of operating an electronic device according to an embodiment.

Referring to FIGS. 5 and 6, when the surface temperature predicted in operation 405 of FIG. 4 as described above is less than a specified threshold 601 (e.g., about 35° C.), for example, as illustrated in FIG. 6, the electronic device (e.g., the electronic device 101 of FIGS. 1 and 2) identifies the heating state of a speaker (e.g., the speaker 230 in FIG. 2) as being a stable state, and does not control an audio signal input to the speaker. In this case, when an audio module (e.g., the audio module 170 of FIGS. 1 and 2) processes the audio signal, the electronic device may transmit the processed audio signal to the speaker without adjusting the audio signal.

The electronic device may continuously obtain first temperature information and second temperature information, and predict a surface temperature based on the obtained first temperature information and second temperature information. For example, the electronic device may predict a surface temperature over time, as illustrated in a surface temperature curve 620 of FIG. 6. As the electronic device identifies that a predicted surface temperature in a first period t0 to t1 does not exceed the specified threshold 601 (e.g., 35° C.) on the surface temperature curve 620, the electronic device may not change the audio signal. For example, when the electronic device identifies that the predicted surface temperature in the first period t0 to t1 is equal to or less than the specified threshold 601 (e.g., 35° C.), the electronic device may identify that control information (a gain value and/or a HPF value) specified for the temperature equal to or less than 35° C. in the control information table as illustrated in FIG. 5 is a value of 0, and output the processed audio signal to the speaker without a change according to the gain of the audio signal by applying the value of 0 to the audio signal.

As illustrated in FIG. 6, the electronic device may identify a change in an audio gain value at time t from an audio gain curve 610. When the surface temperature exceeds the specified threshold 601 (e.g., 35° C.), the electronic device may decrease the strength of the audio signal by applying a gain value corresponding to a specified gain variation (e.g., 0.5) to the audio signal in each time period.

When identifying that a surface temperature predicted by obtaining first temperature information and second temperature information has a temperature value equal to or greater than the specified threshold 601 (e.g., 35° C.) continuously at a next first time t1, the electronic device may identify a gain value (e.g., −0.5) and/or a HPF value (e.g., 0) as control information corresponding to, for example, a range higher than 35° C. and equal to or less than 36° C. in the control information table illustrated in FIG. 5, and change the audio signal based on the identified control information. For example, the electronic device may decrease the strength of the audio signal by applying a gain value of −0.5 to the audio signal in a time period from t1 to t2.

When identifying that a surface temperature predicted by obtaining first temperature information and second temperature information has a temperature value in a range higher than 36° C. and equal to or less than 37° C. at a next second time t2, the electronic device may identify a gain value (e.g., −1.0) and/or a HPF value (e.g., 110) as control information corresponding to the range higher than 36° C. and equal to or less than 37° C. in the control information table illustrated in FIG. 5, and change the audio signal based on the identified control information. For example, the electronic device may decrease the strength of the audio signal by applying the gain value of −1.0 to the audio signal in a time period from t2 to t3.

The electronic device may continuously apply gain values and/or HPF values as control information corresponding to continuously predicted surface temperatures to the audio signal at up to a sixth time t2 to decrease the strength of the audio signal. For example, when predicting a surface temperature corresponding to a target temperature 603 (e.g., 41° C.) at the sixth time t2, the electronic device may decrease the strength of the audio signal by applying a gain value of −3.0 mapped to maximum gain information Max Atten. Gain (e.g., a range higher than 40° C. and equal to or less than 41° C.) until a subsequent predicted surface temperature is decreased to or below the threshold by controlling the audio signal.

When the electronic device controls the audio module to decrease the strength of the audio signal and then the next predicted surface temperature is less than the specified threshold (e.g., 35° C.), the electronic device may not change the strength of the audio signal by applying the value of 0, because control information corresponding to the predicted surface temperature is set to the value of 0.

According to the above-described operation method, the electronic device may continuously predict surface temperatures of a surface area, caused by the heat of the speaker and apply control information corresponding to each predicted surface temperature to an audio signal to control the audio signal during execution of content (e.g., a function, a program, or an application) including audio information. Accordingly, as noted from a first curve (an uncontrolled surface temperature measurement curve) 710 and a second curve (controlled surface temperature measurement curve) 720 illustrated in FIG. 7, a surface temperature may be decreased by controlling an audio signal.

According to an embodiment, a method of operating an electronic device (e.g., the electronic device 101 of FIGS. 1 and 2) may include obtaining first temperature information based on impedance information measured in a coil included in a speaker (e.g., the speaker 230 of FIG. 2) of the electronic device; obtaining second temperature information measured by at least one temperature sensor of the electronic device in a heat source, wherein the heat source is disposed adjacent to the speaker and generates heat, predicting a surface temperature of a surface area of the electronic device, opposite to an internal area in which the speaker is disposed, based on the first temperature information and the second temperature information using a nonlinear approximation function; and controlling an audio signal input to the speaker based on the predicted surface temperature to decrease the surface area temperature.

According to an embodiment, the first temperature information is obtained during execution of content including audio information corresponding to the audio signal. According to an embodiment, the second temperature information is obtained during the execution of the content. According to an embodiment, the at least one temperature sensor is disposed adjacent to the heat source.

According to an embodiment, the controlling of an audio signal may include decreasing a strength of the audio signal input to the speaker by an audio module (e.g., the audio module 170 of FIGS. 1 and 2) of the electronic device, based on the predicted surface temperature exceeding a threshold.

According to an embodiment, the controlling of the audio signal may include sequentially decreasing the strength of the audio signal based on control information corresponding to each of predicted surface temperatures from the threshold until a specified target temperature is reached. According to an embodiment, the control information includes at least one of a gain value or a high pass filter value.

According to an embodiment, the controlling of an audio signal may include controlling the audio signal not to change the strength of the audio signal, when a next predicted surface temperature is less than the threshold after the audio module is controlled to decrease the strength of the audio signal.

According to an embodiment, the controlling of an audio signal may include adjusting amplification of the audio signal to decrease the strength of the audio signal based on control information mapped to each virtual temperature data of a plurality of virtual temperature data, stored in a memory (e.g., the memory 130 of FIG. 1) of the electronic device.

According to an embodiment, the obtaining of the first temperature information may include measuring at least one of the measured at least one of voltage value or a current value of the coil included in the speaker, obtaining the impedance information based on the at least one of the measured voltage value or current value, and obtaining a temperature value corresponding to the impedance information as the first temperature information.

According to an embodiment, in a non-transitory storage medium storing one or more programs, the one or more program may include executable instructions configured to, when executed by at least one processor (e.g., the processor 120 of FIG. 1) of an electronic device (e.g., the electronic device 101 of FIGS. 1 and 2), cause the electronic device to obtain first temperature information based on impedance information measured in a coil included in a speaker (e.g., the speaker 230 of FIG. 2) of the electronic device; obtain second temperature information measured by at least one temperature sensor of the electronic device in a heat source, wherein the heat source is disposed adjacent to the speaker and generates heat, predicting a surface temperature of a surface area of the electronic device, opposite to an internal area in which the speaker is disposed, based on the first temperature information and the second temperature information using a nonlinear approximation function; and control an audio signal input to the speaker based on the predicted surface temperature to decrease the surface area temperature.

The embodiments of the disclosure are intended to provide the description and understanding of the disclosed technical content, not limiting the scope of the technology described herein. Accordingly, the scope of the disclosure should be construed as encompassing all modifications or various other embodiments based on the technical spirit of the disclosure.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment.

With regard to the description of the drawings, similar reference numerals may be used to refer to similar or related elements.

It is to be understood that a singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C" may include any one of, or all possible combinations of the items enumerated together in a corresponding one of the phrases.

As used herein, such terms as "1st" and "2nd" or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, logic; logic block, part, or circuitry. A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., the internal memory 136 or the external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term 'non-transitory' simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been particularly shown and described with reference to certain embodiments thereof, it will be understood by those of ordinary skill in the art that various changes in form and details may be made therein without departing from the spirit and scope of the disclosure as defined by the appended claims and their equivalents.

What is claimed:

1. An electronic device comprising:
a speaker;
at least one temperature sensor;
memory storing one or more computer programs, and
one or more processors electrically coupled to the speaker, the at least one temperature sensor, and the memory, wherein the one or more computer programs include computer-executable instructions that, when executed by the on e or more processors individually or collectively, cause the electronic device to:
based on impedance information measured with respect to a coil included in the speaker while the speaker is outputting sound, determine first temperature information of the speaker
obtain second temperature information measured by the at least one temperature sensor disposed adjacent to the speaker,
determine, using the first temperature information and the second temperature information, a surface temperature of an exterior surface corresponding to the speaker, wherein the surface temperature of the exterior surface corresponding to the speaker is determined based on a predicted temperature determined according to the first temperature and the second temperature, and a monitoring time of the predicted temperature, and
based on the surface temperature of the exterior surface corresponding to the speaker, control a gain of the speaker.

2. The electronic device of claim 1, wherein the one or more computer programs include computer-executable instructions that, when executed by the one or more processors individually or collectively, cause the electronic device to:
determine the surface temperature based on the first temperature information and the second temperature information, during execution of content including audio information corresponding to an audio signal.

3. The electronic device of claim 1, further comprising an audio module electrically coupled to the speaker and the one or more processors,
wherein the one or more computer programs include computer-executable instructions that, when executed by the one or more processors individually or collectively, cause the electronic device to:
control the audio module to decrease a strength of an audio signal input to the speaker, based on the surface temperature exceeding a threshold.

4. The electronic device of claim 3, wherein the one or more computer programs include computer-executable instructions that, when executed by the one or more processors individually or collectively, cause the electronic device to:
control the audio module to sequentially decrease the strength of the audio signal based on control information corresponding to each of surface temperatures from the threshold until a specified target temperature is reached.

5. The electronic device of claim 3, wherein the one or more computer programs include computer-executable instructions that, when executed by the one or more processors individually or collectively, cause the electronic device to:

refrain from changing the strength of the audio signal, when a second surface temperature is less than the threshold after controlling the audio module to decrease the strength of the audio signal.

6. The electronic device of claim 1, wherein the one or more computer programs include computer-executable instructions that, when executed by the one or more processors individually or collectively, cause the electronic device to:

adjust an amplification of an audio signal input to the speaker to decrease strength of the audio signal based on control information mapped to virtual temperature data stored in the memory.

7. The electronic device of claim 6, wherein the control information includes at least one of the gain of the speaker or a high pass filter value.

8. The electronic device of claim 6, wherein the one or more computer programs include computer-executable instructions that, when executed by the one or more processors individually or collectively, cause the electronic device to:

measure at least one of a voltage value or a current value of the coil included in the speaker;

obtain the impedance information based on the at least one of the measured at least one of the voltage value or the current value; and determine the first temperature information based on the obtained impedance information.

9. A method of operating an electronic device, the method comprising:

based on impedance information measured with respect to a coil included in a speaker of the electronic device while the speaker is outputting sound, determining first temperature information of the speaker;

obtaining second temperature information measured by at least one temperature sensor disposed adjacent to the speaker;

determining, using the first temperature information and the second temperature information, a surface temperature of an exterior surface corresponding to the speaker, wherein the surface temperature of the exterior surface corresponding to the speaker is determined based on a predicted temperature determined according to the first temperature and the second temperature, and a monitoring time of the predicted temperature; and based on the surface temperature of the exterior surface corresponding to the speaker, controlling a gain of the speaker.

10. The method of claim 9, wherein the first temperature information is determined during execution of content including audio information corresponding to an audio signal input to the speaker.

11. The method of claim 10, further comprising:

decreasing a strength of an audio signal input to the speaker by an audio module of the electronic device, based on the surface temperature exceeding a threshold.

12. The method of claim 11, further comprising:

sequentially decreasing the strength of the audio signal based on control information corresponding to each of surface temperatures from the threshold until a specified target temperature is reached.

13. The method of claim 11, further comprising:

refraining from changing the strength of the audio signal, when a second surface temperature is less than the threshold after the audio module is controlled to decrease the strength of the audio signal.

14. The method of claim 9, wherein the second temperature information is obtained during execution of content.

15. The method of claim 9, further comprising:

adjusting an amplification of an audio signal input to the speaker to decrease strength of the audio signal based on control information mapped to virtual temperature data stored in a memory of the electronic device.

16. The method of claim 15, wherein the control information includes at least one of the gain of the speaker or a high pass filter value.

17. The method of claim 9, further comprising:

measuring at least one of a voltage value or a current value of the coil included in the speaker;

determining the impedance information based on the at least one of the measured at least one of the voltage value or current value; and obtaining a temperature value corresponding to the impedance information as the first temperature information.

18. A non-transitory storage medium storing one or more programs comprising executable instructions configured to, when executed by at least one processor of an electronic device, cause the electronic device to:

based on impedance information measured with respect to a coil included in a speaker of the electronic device while the speaker is outputting sound, determine first temperature information of the speaker;

obtain second temperature information measured by at least one temperature sensor disposed adjacent to the speaker;

determine, using the first temperature information and the second temperature information, a surface temperature of an exterior surface corresponding to the speaker, wherein the surface temperature of the exterior surface corresponding to the speaker is determined based on a predicted temperature determined according to the first temperature and the second temperature, and a monitoring time of the predicted temperature; and based on the surface temperature of the exterior surface corresponding to the speaker, control a gain of the speaker.

* * * * *